E. J. OGDEN.
CORN PLANTER.
APPLICATION FILED DEC. 5, 1911.

1,079,797.

Patented Nov. 25, 1913.

2 SHEETS—SHEET 1.

WITNESSES

INVENTOR
Edmund J. Ogden
BY Munn & Co
ATTORNEYS

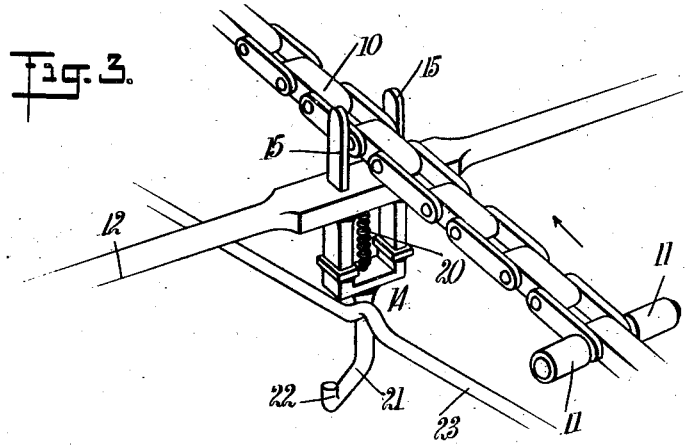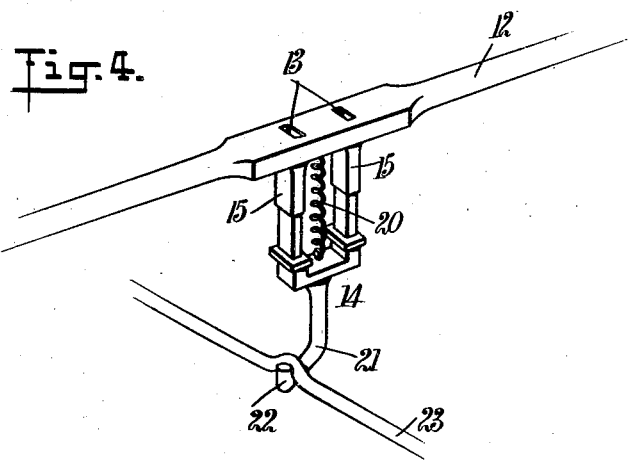

UNITED STATES PATENT OFFICE.

EDMUND J. OGDEN, OF SPRINGFIELD, ILLINOIS.

CORN-PLANTER.

1,079,797.  Specification of Letters Patent.  Patented Nov. 25, 1913.

Application filed December 5, 1911. Serial No. 664,000.

*To all whom it may concern:*

Be it known that I, EDMUND J. OGDEN, a citizen of the United States, and a resident of Springfield, in the county of Sangamon and State of Illinois, have invented a new and Improved Corn-Planter, of which the following is a full, clear, and exact description.

My invention relates generally to corn planters and more particularly it is directed to an improved means for actuating the seed dropping mechanism whereby the seed may be deposited at certain intervals in the ground.

The principal object of my invention is to provide a corn planter of improved construction having simple and efficient means for actuating the seed dropping mechanism.

A further object of the invention is to provide an improved construction for rendering the seed dropping mechanism inoperative when so desired, the planter being adapted to be moved over the ground when the mechanism is in such position.

A further object of my invention is to provide a new and improved corn planter wherein the arrangement of the parts is such that the difficulty of getting properly started at the end of the field or at the end of a row is overcome since the planter does not necessarily drop seed at the starting point but is moved some distance forwardly before the seed-dropping mechanism begins to operate.

Other objects and advantages of the invention will appear as the description thereof proceeds, all of which is particularly pointed out and included in the appended claims.

Reference is to be had to the accompanying drawings forming a part of this specification in which similar characters of reference denote corresponding parts in all the views, and in which—

Figure 1:
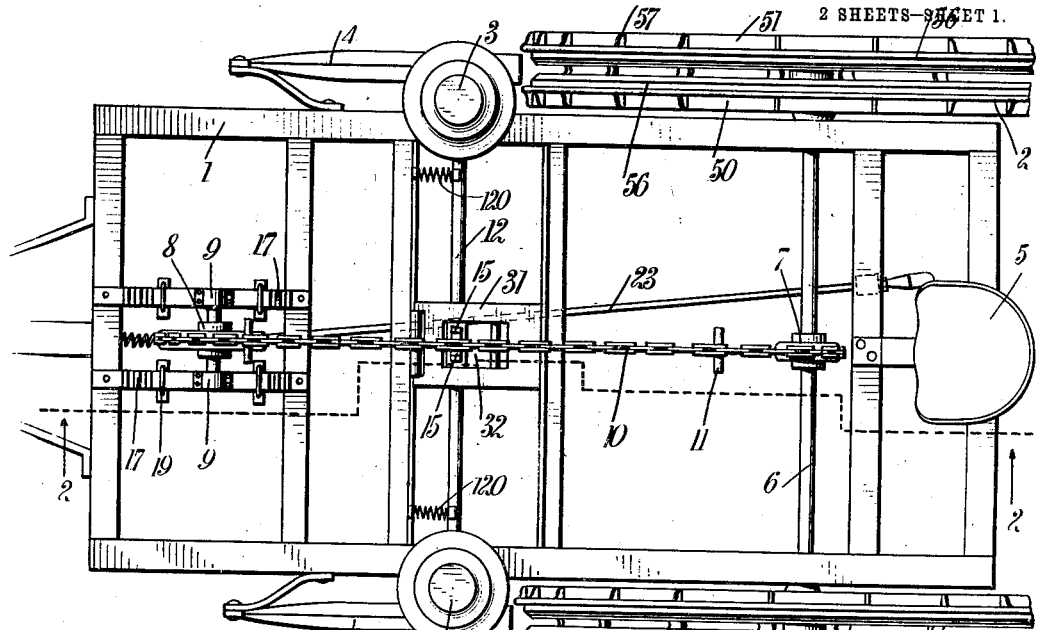
Figure 2:
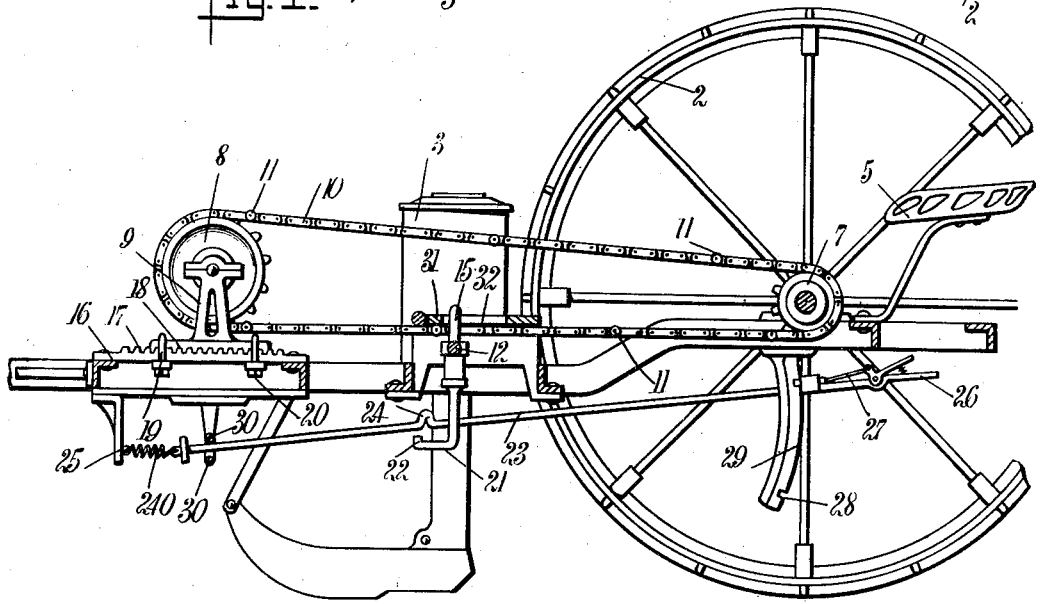

Figure 1 is a top plan view of the machine; Fig. 2 is a vertical sectional view thereof on the line 2—2 of Fig. 1; Fig. 3 is a perspective view of the coöperating parts for actuating the seed dropping mechanism; while Fig. 4 is a similar view of the parts in inoperative position.

The frame 1 of the planter may be such as is best adapted for the purpose and may embody any suitable form of construction having thereon wheels 2, the frame being provided with the usual seed hoppers 3, furrow openers 4, and also a seat 5 to accommodate the operator.

The axle 6 on which the wheels 2 are mounted is provided at an intermediate portion with a sprocket 7, there being another sprocket 8 adjacent the front of the frame mounted in suitable bearings 9, the bearings and sprocket being adjustably mounted in a manner to be later described; an endless chain 10 having laterally extending lugs 11 thereon extends around the sprockets and, as the machine is drawn over the ground, the motion of the chain is continuous and uniform.

Extending transversely of the frame of the machine and communicating with each of the hoppers 3 is a rod 12 which is mounted to oscillate, the rod being provided at an intermediate portion with openings 13 extending therethrough, there being a movable member designated as a whole as a hook 14, the bifurcated ends 15 of which enter the openings 13 and may lie therein in the position shown in Figs. 3 and 4.

Referring particularly to Fig. 3 it is to be noted that the chain 10 passes between the bifurcated ends 15 of the hook, the length of each of the lugs 11 being such that as the chain is moved these lugs may engage the bifurcated ends whereby the rod 12 may be partially turned, thereby operating suitable valves at the bottom of the hoppers 3 and permitting a desirable amount of seed to be deposited into the ground; the valves are returned to closed position by means of springs 120 engaging the rod and the machine frame. Each of these lugs 11 may embody a roller, if so desired, adapted to revolubly engage the bifurcated ends 15 in the operation of the machine whereby the friction and wear of the parts is materially reduced.

Since the corn is planted at certain intervals in the ground, the lugs 11 on the chain 10 will be spaced apart a distance equal to the distance between successive deposits of seed, it being obvious, however, that it may be desirable in some cases to vary the distance between successive deposits of seed and to this end the sprocket 8 and bearings 9 (Fig. 2) with which the chain 10 engages are made adjustable whereby chains of different lengths or chains of the same length having lugs 11 spaced different distances thereon may be easily placed in position on the planter. Suitable supports 16 having a serrated upper surface 17 engage the lower serrated face 18 of the bearing 9, the serrated faces being held in engagement and in different positions longitudinally of each other in any suitable manner, preferably by means of clamps 19 which embody nuts 20 whereby the parts may be securely held together. Such an arrangement permits the easy and rapid withdrawal of one chain and the positioning thereon of another so that should it be desirable to use the machine in different fields wherein different distances between successive seed droppings are desired, the change is easily accomplished and in a short space of time.

The bifurcated end of the hook 14 when in operative position causes the rod 12 to be partially rotated each time the lugs 11 come into engagement with the hook and since it is desirable that the machine be also drawn over the ground with the seed planting device in inoperative position I have provided suitable means for accomplishing this and which is preferably of the following construction. The hook 14 is maintained in operative position by means of a helical spring 20 positioned between the arms 15, one end of the spring being secured to the rod 12 and the other end being secured to the hook itself, as shown particularly in Fig. 3. The lower end of this hook comprises an offset member 21 having an upturned end 22 adapted for engagement with a longitudinally extending locking rod 23 having a bent portion 24 therein, the forward end of the locking rod being resiliently held in place by being connected to one end of a helical spring 240, the other end of which is secured to a frame member 25, the opposite or rear end of the locking rod being provided with a foot plate 26 having a pawl 27 thereon coöperating with the notches 28 in the quadrant 29 suitably secured to one of the frame members. This helical spring provides for resiliently mounting the locking rod so that when the pawl 27 is brought out of engagement with the lower notch 28 in the quadrant 29 the rod will return to the position shown in Fig. 2 by reason of the forward end of the rod being connected to the spring 240, the rod itself passing between the closely adjacent supports 30, as shown particularly in Fig. 2.

In order to maintain the chain closely adjacent the bifurcated ends 15 of the hook 14 when the machine is in use and to insure that this hook will be operated each time one of the lugs 11 comes into engagement therewith I make use of a suitable device 31, which I term a saddle, having an opening 32 therein within which the bifurcated ends 15 are adapted to move, the saddle being positioned closely adjacent the top of the chain 10 at the front and rear of the ends 15 of the hook so that, as the chain moves, the engagement between the lugs and the ends of the hook will be positive, thereby providing for turning of the rod 12 with the consequent actuation of the seed-dropping mechanism.

When it is desired to draw the machine over the ground with the seed-dropping mechanism in inoperative position, the foot plate 26 may be pressed downwardly, the pawl 27 thereon being brought into engagement with the lower notch 28 in the quadrant 29, the bent portion 24 of the rod coming into engagement with the offset member 21 of the hook 14 and being held in position by reason of the upturned end 22 thereon; this bent portion 24 of the rod 23, in addition to engaging the offset end 21 whereby the hook is pulled into the position shown in Fig. 4, permits the offset end of the hook to move free and clear of engagement with the rod 23 during normal operation of the machine.

It is to be particularly noted that the gear or sprocket 8 adjacent the forward end of the machine is capable of adjustment within a certain range by reason of the interengagement of the serrated faces of the elements 9 and 16 so that, while a single planter may be provided, a plurality of chains of different lengths, or chains of the same length having lugs spaced varying distances apart may be used therewith, thereby adapting the planter for use in different fields and for planting the corn varying distances apart.

It is to be especially noted that the particular value of the corn planter which I have described and illustrated lies in the construction and arrangement of the parts whereby, when starting a row of corn or when getting started at the beginning of a field, that the seed is not necessarily dropped immediately on moving the machine forwardly; due to the fact that different chains with different lugs thereon are adapted for use with the device, the seed in each successive row may be planted directly even with the last hill in the preceding row. This is a valuable feature in the operation of corn planters and is one which I consider the most valuable of the invention herein set forth.

The operation and use of the improved corn planter has been set forth in describing the construction and relation of the parts and it is believed that such use is apparent; the provision of means whereby chains of different length or different chains having differently spaced lugs thereon may be provided is of great advantage in sowing corn as in different sections of the country, or in different areas of the same land, periodic dropping of the seed may be varied, the machine being thereby of a standard construction, thus enabling it to be produced at a small cost.

The size and material of which the different parts are made will depend largely upon the price at which the outfit is to be sold as well as the areas to be planted, such changes, however, and those of design being included within the spirit of my invention.

Having thus described my invention, I claim as new, and desire to secure by Letters Patent:—

1. A corn planter embodying means for dropping seed, the said means comprising a rod, a member having a bifurcated end movably carried by the rod, a chain having lugs thereon, the chain passing between the bifurcated ends, the lugs periodically engaging the said ends in order to turn the rod, means for holding the bifurcated ends in the path of the lugs and other means for moving the said bifurcated ends out of the path of the lugs whereby the machine may be driven over the ground with the seed dropping mechanism in inoperative position.

2. A corn planter embodying means for dropping seed, the said means comprising a rod, means for periodically actuating the said seed dropping mechanism, and comprising a fork carried by the rod, and a movable chain having lugs thereon, the lugs engaging the ends of the fork whereby the rod is turned, a spring for keeping the ends of the fork in the path of the lugs, and other means comprising a locking rod adapted for engagement with the end of the said forked member whereby the ends may be brought out of the path of the lugs and the seed dropping mechanism held in inoperative position.

3. A corn planter embodying seed dropping mechanism, the said mechanism comprising a rod, a forked member carried by the rod and movable thereon, a chain having lugs thereon, movement of the chain bringing the lugs into engagement with the ends of the forked member whereby the seed dropping mechanism is actuated, a spring for keeping the forked ends in the path of the lugs, together with means for moving the forked element out of the path of the lugs, the said means comprising a longitudinally extending locking rod resiliently mounted at one end, the other end thereof being movable, the said locking rod being provided with a bent portion adapted for engagement with the under side of the forked element, and means for holding the locking rod in position.

4. A corn planter embodying mechanism for dropping seed, the said mechanism embodying a rod, an element carried by the rod having a bifurcated upper end and an offset lower end, a chain having lugs thereon, the lugs being adapted for engagement with the forked end of the said member whereby the rod is turned, together with a locking rod resiliently mounted at its forward end and having an intermediate bent portion, the said bent portion being adjacent the offset end of the said member whereby when the parts are in operative position the engagement of the lugs with the forked end of the said member will turn the rod, the bent portion of the locking rod providing a pocket into which the offset end may swing out of engagement with any of the parts.

5. A corn planter embodying means for dropping seed, the said means comprising a rod, a fork carried by the rod and movable relatively thereto, a chain for moving the rod through engagement with the fork, and means for moving the fork to a certain position, whereby the chain does not engage therewith.

6. In a corn planter, the combination of seed dropping mechanism, a hook movably mounted in position and constituting part of the said mechanism, the hook coöperating with movable means whereby the seed-dropping means is actuated, and a longitudinally extending locking rod for engagement with the said hook in order to move it, a pawl carried by the rod, a quadrant coöperating with the pawl, a fixed support through which the rod extends, and a resilient element between the end of the rod and the frame of the machine, whereby the rod will return to certain position when the pawl is brought out of engagement with the said quadrant.

In testimony whereof I have signed my name to this specification in the presence of two subscribing witnesses.

EDMUND J. OGDEN.

Witnesses:
L. W. MEREDITH,
J. M. WELDEN.